G. GIANGIOPO.
GUNNERY TRAINING APPARATUS.
APPLICATION FILED OCT. 6, 1919.

1,354,182. Patented Sept. 28, 1920.

INVENTOR
Giuseppe Giangiopo
By Fay, Oberlin & Fay
ATTORNEYS.

UNITED STATES PATENT OFFICE.

GIUSEPPE GIANGIOPO, OF CLEVELAND, OHIO.

GUNNERY-TRAINING APPARATUS.

1,354,182.   Specification of Letters Patent.   Patented Sept. 28, 1920.

Application filed October 6, 1919. Serial No. 328,816.

*To all whom it may concern:*

Be it known that I, GIUSEPPE GIANGIOPO, a citizen of the United States, and a resident of Cleveland, county of Cuyahoga, and State of Ohio, have invented a new and useful Improvement in Gunnery-Training Apparatus, of which the following is a specification, the principle of the invention being herein explained and the best mode in which I have contemplated applying that principle, so as to distinguish it from other inventions.

The present invention relates, as indicated to gunnery training apparatus, and more particularly to an apparatus for training gunners for tank service. Provision is made to transmit a rolling and rocking movement to the platform or support on which the gun is mounted, which will approximate the movement incurred by a tank while in action over such ground as would be encountered thereby. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
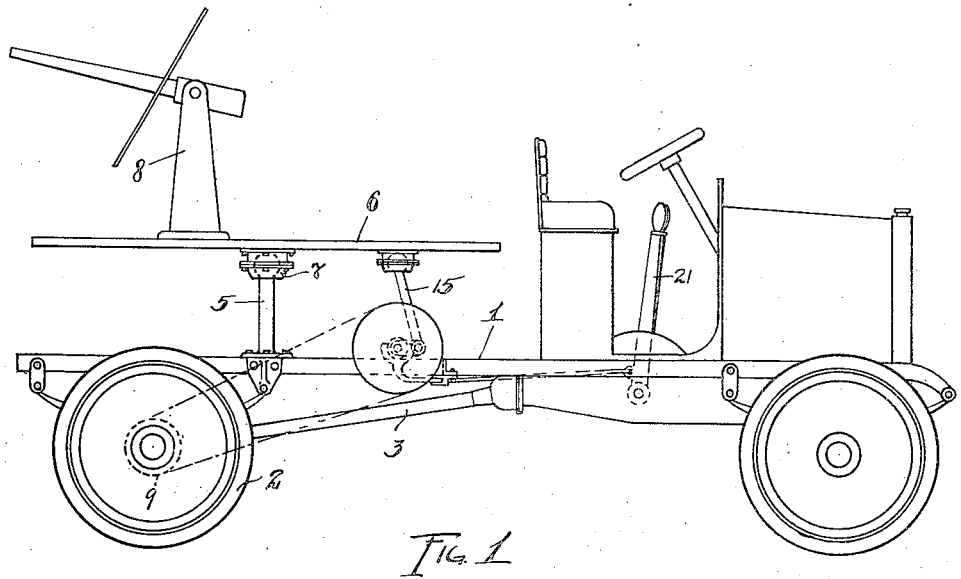
Figure 2:
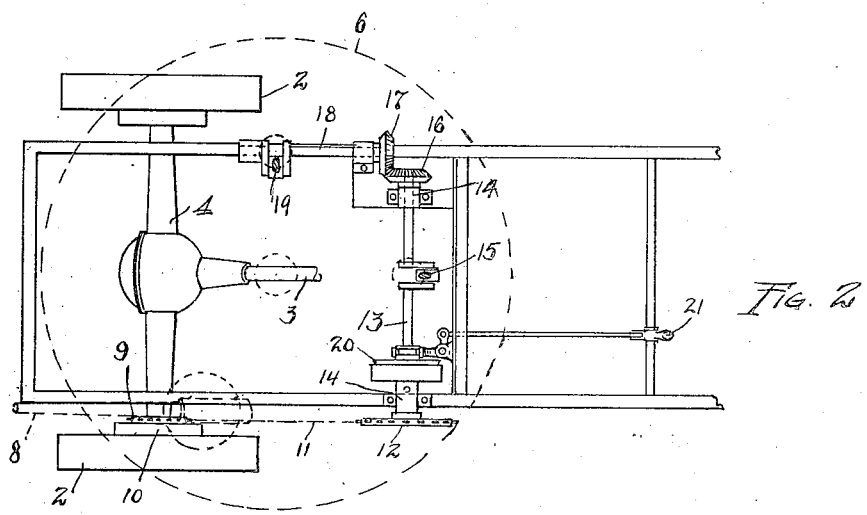

Figure 1 is a side elevation of my device mounted on a motor truck chassis; and Fig. 2 is a plan view partly in section illustrating one means of transmitting power to the mechanism.

The present invention is shown mounted on a motor truck chassis 1 provided with the usual driving wheels 2, to which power is transmitted for the engine through the propeller shaft 3 and the rear axle 4.

Carried by any suitable means on the chassis 1 is a column or support 5, on the upper end of which is movably mounted a table or platform 6 by means of a ball and socket joint 7. A gun 8 is mounted near the outer edge of the platform 6 and is adapted to be operated by the gunner during the instructions. Means are provided for imparting a rolling or rocking movement to the platform 6, which consists of a sprocket 9 mounted on the brake-band 10 of one of the wheels 2, from which power is transmitted by means of a chain 11 to another sprocket 12 on a crankshaft 13 held in bearings 14 on the chassis 1. A connecting rod 15 engages the crankshaft 13 and is provided at its upper end with a spherical enlargement adapted to engage a socket on the lower surface of the platform 6, thereby forming a universal joint. The end of the crankshaft 13 opposite the sprocket 12 is provided with a bevel gear 16 which meshes another bevel gear 17 mounted on another crankshaft 18 at right angles to the crankshaft 13. The crankshaft 18 is also provided with a connecting rod 19 having a ball and socket joint with the platform 6 similar to the connecting rod 15.

A clutch 20 is provided on the crankshaft 13, adapted to be controlled by means of a lever 21 adjacent the seat of the driver of the truck, whereby the driver can control the movement of the platform 6.

As will be seen, I have provided a simple and efficient device for gunnery training whereby a rolling and rocking movement, closely simulating the movement of a tank, is imparted to the operating platform and one which can be applied to any automobile chassis with very little alteration thereto.

By means of the two connecting rods I am enabled to impart movement to the platform in more than one direction, and with the means provided, the rolling and rocking of the device is always controlled by the instructor who has charge of the machine. By means of this device practice may be obtained on comparatively level ground, which is generally encountered on rifle and artillery ranges, at the same time providing the gunner with the pitching and tossing which he would encounter in a tank during actual warfare.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination with a motor driven vehicle, of a platform pivotally mounted upon the vehicle frame, a gun mounted upon said platform, a crank shaft mounted transversely upon said frame, a rod connecting said crank shaft with the platform about centrally and longitudinally of the vehicle, a crank shaft mounted longitudinally upon said frame, gearing connecting said crank shafts, a rod connecting said second crank shaft with the platform at one side of the vehicle, and gearing connecting the driving axle of said vehicle with said first named crank shaft for imparting a longitudinal and transverse rocking movement to said platform.

2. In a device of the character described, the combination with a motor driven vehicle, of a platform pivotally mounted upon the vehicle frame, a gun mounted upon said platform, a crank shaft mounted transversely upon said frame, a rod connecting said crank shaft with the platform about centrally and longitudinally of the vehicle, a crank shaft mounted longitudinally upon said frame, gearing connecting said crank shafts, a rod connecting said second crank shaft with the platform at one side of the vehicle, gearing connecting the driving axle of said vehicle with said first named crank shaft for imparting a longitudinal and transverse rocking movement to said platform, and means for disconnecting the first named crank shaft from its driving mechanism controllable from the driver's seat.

Signed by me, this 19th day of September, 1919.

GIUSEPPE GIANGIOPO.

Witnesses:
 FRANK J. DI SANTO,
 JAMES F. SANTORELLI.